United States Patent [19]

Sato et al.

[11] Patent Number: 4,474,822
[45] Date of Patent: Oct. 2, 1984

[54] PROCESS FOR THE PREPARATION OF INSTANT TEA

[75] Inventors: Jinichi Sato; Toshiro Kurusu; Naoyoshi Kondo, all of Iwakura; Makoto Tamaki, Komaki, all of Japan

[73] Assignee: Sata Shokuhin Kogyo Kabushiki Kaisha, Aichi, Japan

[21] Appl. No.: 407,242

[22] Filed: Aug. 10, 1982

Related U.S. Application Data

[63] Continuation-in-part of Ser. No. 285,034, Jul. 20, 1981, abandoned.

[30] Foreign Application Priority Data

Aug. 9, 1980 [JP] Japan ................................. 55-109477
Jan. 19, 1981 [JP] Japan ................................. 56-004962

[51] Int. Cl.$^3$ ............................................... A23F 3/40
[52] U.S. Cl. ................................... 426/597; 426/594; 426/650; 426/651; 426/596; 426/598
[58] Field of Search ............... 426/650, 651, 655, 598, 426/597, 596, 594

[56] References Cited

U.S. PATENT DOCUMENTS 2,827,452  3/1958  Achlenk et al. ................ 426/650 X
3,022,173  2/1962  Tiedemann ..................... 426/594 X
3,061,444  10/1962  Rogers et al. .................. 426/651 X
3,140,184  7/1964  Robbins .......................... 426/650 X
3,425,910  2/1969  Armbruster et al. ................ 435/97
3,453,259  7/1969  Parmerter et al. ............. 426/650 X
3,459,731  8/1969  Gramera et al. ............... 426/650 X
3,459,732  8/1969  Hull et al. ....................... 426/650 X
3,528,819  9/1970  Hamilton et al. ................... 426/594
4,001,438  1/1977  Marmo et al. .................. 426/651 X
4,317,881  3/1982  Yagi ...................................... 435/97

OTHER PUBLICATIONS

Pintauro, Soluble Tea Production Processes, 1970, Noyes Data Corporation, Park Ridge, NJ, p. 28.
Pintauro, Soluble Coffee Manufacturing Processes, 1969, Noyes Development Corp., Park Ridge, NJ, pp. 28-29.

Primary Examiner—Joseph Golian
Attorney, Agent, or Firm—Browdy and Neimark

[57] ABSTRACT

Tea leaves are extracted with a cyclic dextrin-containing liquid and this extract is dried to obtain an instant beverage. According to this process, valuable components of tea leaves or the like are effectively extracted by the cyclic dextrin-containing liquid, and extracted soluble and aromatic components are effectively protected by the cyclic dextrin when the extract is dried to form an instant beverage. The obtained instant beverage such as instant tea has excellent fragrance and flavor.

3 Claims, No Drawings

PROCESS FOR THE PREPARATION OF INSTANT TEA

FIELD OF INVENTION

This is a continuation in part of parent copending application Ser. No. 285,034, filed July 20, 1981 now withdrawn in favor of the present file, the description of the invention of which is incorporated herein.

The present invention relates to a process for the preparation of instant beverages such as instant green tea or instant black tea. More particularly, the present invention relates to a process for the preparation of instant beverages in which soluble flavor and aromatic components present in tea leaves are extracted stably and effectively and the extract is dried without deterioration or evaporation of these soluble flavor and aromatic components to obtain an instant beverage which has excellent flavor and flagrance comparable to those of green tea and black tea obtained by making tea by extraction of the tea leaves with hot water.

DESCRIPTION OF PRIOR ART

Ordinarily, tea is obtained by extracting tea leaves with hot water and the obtained hot water extract is drunk. This hot water extract contains as valuable components amino acids, carbohydrates, theine, saponin, caffeine and aromatic components. Tea leaves are ordinarily extracted with warm or hot water maintained at a temperature higher than 60° C. in an amount 30 to 100 times the amount of the tea leaves for about 30 seconds to about 5 minutes, though the extracting conditions differ to some extent, and the resulting extract is drunk.

Even if the same tea leaves are used, the composition of the components to be extracted differs according to the tea-making method, that is, depending on the temperature of hot water, the extraction time and the amount of hot water to be added to tea leaves, and also the fragrance is greatly influenced by these factors. Furthermore, when the obtained hot water extract is allowed to stand, the flavor and color change moment by moment.

Conventional processes for the preparation of instant tea beverages involve various problems in connection with the manner of extraction of tea leaves, deterioration of the obtained extracts and degradation of flavor and fragrance or evaporation of valuable and aromatic components during the drying step. Accordingly, it has been very difficult to economically prepare instant tea beverages which are excellent in quality.

SUMMARY OF INVENTION

Research has now been made with a view to overcoming the defect of reduction of the flavor and fragrance by loss of aromatic components in conventional instant beverages such as instant green tea or instant black tea and it has now been found that when tea leaves are extracted with a liquid, e.g. water, containing cyclic dextrin (Schardinger dextrin), soluble components and aromatic components are extracted at a high efficiency, and there are obtained excellent instant beverages in which these components are effectively protected and deterioration or evaporation of these components does not occur at the drying step or during storage.

More specifically, in accordance with the present invention, there is provided a process for the preparation of instant beverages, which comprises extracting tea leaves with a liquid containing a cyclic dextrin.

When extraction is carried out by using a cyclic dextrin-containing liquid according to the present invention, the liquid intrudes into the texture of tea leaves to selectively leach out valuable components and these valuable components can be obtained in such a protected state that deterioration is effectively prevented. It is believed that cyclic dextrin dissolved in the extracting liquid exerts a function of partially including or associating soluble and aromatic components in the peripheral portion of cyclic dextrin in the dissolved state reversibly or irreversibly.

Accordingly, if the so obtained extract containing soluble and aromatic components of tea leaves which are protected by cyclic dextrin, is dried at a temperature as low as possible by freeze drying, vacuum drying or spray drying, an instant beverage having good flavor and fragrance is provided comparable to those of green tea or black tea obtained by the ordinary method of making tea.

DETAILED DESCRIPTION OF PREFERRED EMBODIMENTS

Cyclic dextrin that is used in the present invention is obtained by a method comprising reacting starch with a culture liquid of *Bacillus macerans* or with an enzyme liquid formed therefrom, and commercially available products manufactured by this method or other appropriate methods can be utilized in the present invention. Ordinarily, a product is obtained by liquefying or gelatinizing starch, reacting the liquefied or gelatinized starch with a cyclic oligosaccharide-forming enzyme or purifying the resulting $\alpha$-, $\beta$-, $\gamma$-cyclodextrin and other cyclodextrin or a mixture thereof or by liquefying or gelatinizing starch, reacting the liquefied or gelatinized starch with a cyclic oligosaccharide-forming enzyme, separating the obtained mixture of cyclic dextrin and acyclic dextrin and purifying the separated mixture optionally after hydrolyzing the dextrin mixture with an enzyme or the like under such conditions as not causing decomposition of cyclic dextrin.

When a mixture of cyclic dextrin and acyclic dextrin is used, it is preferred that the ratio of cyclic dextrin be at least 10% of the mixture and the average degree of polymerization of the acyclic dextrin portion be 3 to 40. However, these values are not critical, but other values may optionally be chosen according to need. The content of cyclic dextrin (or a mixture of cyclic dextrin and acyclic dextrin) in the extracted components is ordinarily at least 1.0% and preferably at least 1.5%.

In accordance with one preferred embodiment of the present invention, an ethyl alcohol-containing liquid is incorporated into the cyclic dextrin-containing liquid. The ethyl alcohol-containing liquid used is selected from ethyl alcohol and spirits such as vodka, whisky, brandy and rum. The concentration of ethyl alcohol in the cyclic dextrin-containing liquid is preferably 10 to 60%. If the concentration of ethyl alcohol is higher than 60%, unsavory components or peculiar aromatic components are extracted, and if the concentration of ethyl alcohol is lower than 10%, the intended effect by the use of the ethyl alcohol-containing extraction liquid cannot be attained.

The cyclic dextrin-containing liquid that is used in the present invention contains 1.0 to 20% of cyclic dextrin and is, preferably an aqueous 1.5 to 6.0% of cyclic dextrin.

The cyclic dextrin-containing liquid is used in an amount 2 to 30 times, preferably 4 to 15 times, the amount of tea leaves on a weight basis. Extraction can be carried out batchwise or in a continuous manner. The extraction temperature is ordinarily 10° to 90° C., and an appropriate temperature not causing dissolution of undesirable components is chosen according to the kind of tea. Since deterioration of the extracted components is not caused in the present invention, a concentrated extract can be obtained by recycling the extract to the extraction step 2 to 10 times repeatedly.

When a non-modification smell is left in the extract obtained by low temperature extraction because heating is not effected, this small can be removed by heating the extract at an ordinary extraction temperature of 60° to 90° C. for a short time.

The so obtained liquid extract may be packed in a can as it is or after sugar or the like necessary for a beverage is added to the extract, and the canned extract is marketed. Aromatic components are not deteriorated during storage and a high quality can be maintained.

Furthermore, according to the present invention, the obtained extract may be dried at a temperature as low as possible by spray drying, vacuum drying or freeze drying, whereby a powder having a good quality and a high storage stability is obtained without no substantial deterioration by evaporation due to drying.

In the present invention, the aromatic components can be protected effectively by cyclic dextrin during drying and after drying. Accordingly, excellent instant green tea or instant black tea beverages having good fragrance and flavor can be obtained.

As the tea that is used in the present invention, there can be mentioned, for example, non-fermented teas (green teas) such as green teas of middle grade (sen-cha), kettle tea, coarse green tea (ban-cha), roasted green tea (hoji-cha) and refined green tea (gyokuro), semi-fermented teas such as oolong tea and pouchung tea, fermented tea such as black tea, and tea-like materials such as leaves of Chinese matrimony vine and mate. When these starting materials are extracted according to the process of the present invention and are subsequently dried according to need, there can be obtained instant beverages having good fragrance and flavor and high quality stability.

The present invention will now be described in detail with reference to the following Examples that by no means limit the scope of the invention.

EXAMPLE 1

(A) In 10.5 l of warm water maintained at 65° C. were immersed 1.5 kg of sen-cha leaves for 3 minutes, and the green tea leaves were immediately cooled to 25° C. and compressed to obtain 9 l of a squeeze liquid having a Brix value of 5.5°. This squeeze liquid was allowed to stand at 25° C. for 30 minutes, and 0.2 kg of powdery dextrin (having a DE value of 13) was incorporated and dissolved in 9 l of the squeeze liquid and the liquid was spray-dried at a chamber temperature of 85° C. to obtain 0.6 kg of a powdered tea extract (hereinafter referred to as "powdered tea extract A").

(B) in the same manner as described in (A) above, 9 l of a squeeze liquid having a Brix value of 5.5° was prepared and allowed to stand at 25° C. for 30 minutes. Then 0.2 kg of a cyclic dextrin-containing powder [comprising 20% of cyclic dextrin (consisting of 15%, 29% and 56% of α-, β- and γ-cylodextrins), 3.6% of glucose, 11.1% of maltose and 65.3% of oligosaccharide] was incorporated and dissolved in the squeeze liquid, and the liquid was spray-dried under the same conditions as described in (A) above to obtain 0.6 kg of a powdered tea extract (hereinafter referred to as "powdered tea extract B").

(C) In 10.5 l of warm water maintained at 65° C. was dissolved 0.2 kg of the same cyclic dextrin-containing powder as used in (B) above, and 1.5 kg of the same sen-cha leaves as used in (A) and (B) above were immersed in the liquid for 3 minutes. The tea leaves were immediately cooled to 25° C. and compressed to obtain 9.1 l of a squeeze liquid having a Brix value of 7.5°. In the same manner as described in (A) above, the squeeze liquid was allowed to stand at 25° C. for 30 minutes and spray-dried to obtain 0.6 kg of a powdered tea extract (hereinafter referred to as "powdered tea extract C").

(D) In 10.5 l warm water maintained at 65° C. was dissolved 0.2 kg of the same powdery dextrin (having a DE value of 13), as used in (A) above, and 1.5 kg of the same sen-cha leaves as used in (A) and (B) above were immersed in the liquid for 3 minutes. The tea leaves were immediately cooled to 25° C. and compressed to obtain 9.1 l of a squeeze liquid having a Brix value of 7.5°. In the same manner as described in (A) above, the squeeze liquid was allowed to stand at 25° C. for 30 minutes and spray-dried to obtain 0.6 kg of a powdered tea extract (hereinafter referred to as "powdered tea extract D").

Each of the so-obtained powdered tea extracts was dissolved in warm water (80° C.) in an amount of 1 g per 150 ml of warm water, and comparative organoleptic tests were made on the flavor and the like by a panel of 10 experts. With respect to each item, 4 points were given to the best extract, 3 points were given to the second extract, 2 points were given to the third extract and 1 point was given to the fourth extract. The obtained results are shown in Table 1. From the test results shown in Table 1, it will readily be understood that the powdered tea extract C is excellent over the powdered tea extracts A, B and D in the fragrance, flavor and color.

TABLE 1

| | Comparative Organoleptic Test Results (Powdered Tea Extracts) | | |
| --- | --- | --- | --- |
| | Fragrance | Flavor | Color of Water |
| Powdered Tea Extract A | 16 points (no substantial fragrance but moldering smell) | 16 points (strong, bitter and astringent tastes) | 16 points (reddish) |
| Powdered Tea Extract B | 26 points (no substantial fragrance) | 29 points (strong, pluckery taste) | 24 points (dark brown) |
| Powdered Tea Extract C | 38 points (good fragrance inherent to sen-cha) | 37 points (well-balanced bitterness and puckery taste) | 34 points (clear green inherent to sen-cha) |
| Powdered Tea Extract D | 20 points (no substantial fragrance | 18 points (strong, bitter and astringent | 26 points (dark brown) |

TABLE 1-continued

| Comparative Organoleptic Test Results (Powdered Tea Extracts) | | |
|---|---|---|
| Fragrance | Flavor | Color of Water |
| but moldering smell) | tastes) | |

The total points of 10 experts are shown in Table 1 and a typical opinion is described in the parenthesized portion.

EXAMPLE 2

A counter-current type extraction column equipped with a jacket was charged with 1200 g of ground green tea roasted to a deep degree (hoji-cha). Separately, an extracting liquid was prepared by dissolving 80 g of β-cyclodextrin in 3 l of warm water maintained at 60° C.

The above β-cyclodextrin-containing liquid was fed from the bottom to the top in the extraction column at a flow rate of 2.0 l/hr while maintaining the interior of the extraction column at 60° C. Subsequently, an appropriate amount of warm water maintained at 60° C. was fed into the extraction column. An extract was obtained by collecting initially 3 l of the overflow liquid, and the extract was cooled to 20° C. and stored in this state until the extract was transferred to the subsequent drying step.

Then, 130 g of a dextrin powder having a DE value of 13 was incorporated and dissolved in 3 l of the above extract (having a solid concentration of 12.3%), and the resulting liquid was spray-dried at a chamber temperature of 80° C. by using a spray drier to obtain 500 g of a powdered roasted green tea.

In 100 ml of warm water maintained at 80° C. was dissolved 1 g of the so-obtained powdered roasted green tea extract. The obtained tea had good fragrance and flavor which were not substantially different from those of green tea obtained by using the starting ground roasted green tea according to the ordinary tea-making method.

EXAMPLE 3

In 3250 l of water maintained at 30° C. was dissolved 200 kg of a cyclic dextrin-containing powder (comprising 30% of α-cyclodextrin, 13% of β-cyclodextrin, 7% of γ-cyclodextrin and 50% of dextrin), and 500 kg of ground sen-cha leaves were immersed in the solution for 30 minutes and compressed by a compressing machine to obtain 2900 l of an extract having a Brix value of 11.8°. Then, 500 kg of the same ground sen-cha leaves as used above were immersed in the obtained extract (maintained at 30° C.) for 30 minutes and treated in the same manner as described above to obtain 2500 l of an extract having a Brix value of 17.0°.

Then, 2500 l of the obtained extract (having a solid concentration of 14.8%) was heated at 75° C. for 30 seconds by using a plate-type heat exchanger and was then cooled to 25° C.

The extract was spray-dried at a chamber temperature of 75° C. by using a spray drier to obtain 370 kg of a powdered sen-cha extract.

When 0.9 g of the so-obtained powdered sen-cha extract was dissolved in 100 ml of warm water, sen-cha was instantly formed very conveniently. If this powdered extract was dissolved in cold water, cold water-brewed sen-cha having a clear green tea color and excellent flavor and fragrance was obtained.

EXAMPLE 4

In 350 l of water maintained at 30° C. was dissolved 27 kg of a cyclic dextrin-containing powder (comprising 30% of α-cyclodextrin, 13% of β-cyclodextrin, 7% of γ-cyclodextrin and 50% of dextrin), and 50 kg of black tea leaves were immersed in this solution at 30° C. for 40 minutes and compressed to obtain 305 l of an extract having a Brix value of 10.4°. Then, 50 kg of the same black tea leaves as used above were immersed in the obtained extract (maintained at 30° C.) for 30 minutes at 30° C. and treated in the same manner as described above to obtain 260 l of an extract having a Brix value of 14.0°.

The so-obtained extract was heated at 80° C. for 60 seconds by using a plate-type heat exchanger and was then cooled to 25° C. The extract was treated by a centrifugal separator to remove opacity and obtain 255 l of a clear extract having a solid concentration of 12.2%.

The extract was spray-dried at a chamber temperature of 85° C. by using a spray drier to obtain 30 kg of a powdered black tea extract.

When 1.0 g of the so-obtained powdered black tea extract was dissolved in 100 ml of warm water, black tea having good fragrance and flavor not substantially different from those of black tea obtained by the ordinary black tea-making method was obtained. When the powdered extract was dissolved in cold water, there was instantly obtained tea having a clear black tea color free of the creaming-down phenomenon.

EXAMPLE 5

244 g of β-cyclic dextrin was dissolved in 7 l of warm water maintained at 40° C., and therein 1 kg of black tea leaves were immersed with stirring at 40° C. for 30 minutes and compressed to obtain 6 l of an extract having a Brix value of 7.4°. Then, 1 kg of the same black tea leaves as used above were immersed with stirring in the above obtained extract at 40° C. for 30 minutes and compressed to obtain 5 l of an extract having a Brix value of 12.0°.

5 l of the so-obtained extract was heated at 75° C. for 15 seconds by using a plate-type heat exchanger and was then cooled to 35° C. The extract was treated by a centrifugal separator to remove opacity and obtain 5 l of a clear extract having a solid concentration of 10.2%.

Next, 2.5 l of the so-obtained clear extract was spray-dried at a chamber temperature of 90° C. by using a spray drier to obtain 250 g of a powdered extract. 250 g of the so-obtained powdered extract was dissolved in 2.5 l of the above remaining clear extract and then the resultant solution was spray-dried at a chamber temperature of 90° C. by using a spray drier to obtain 500 g of a powdered black tea extract.

When 1.0 g of the so-obtained powdered black tea extract was dissolved in 100 ml of warm water, black tea having an excellent black tea fragrance, flavor and color was obtained.

EXAMPLE 6

(1) In each 700 g of cyclic dextrin-containing liquids (water solution, dextrin composition: 50%α and 50%β) shown in Table 2, each 100 g of black tea leaves (#5930 supplied by MITSUI NORIN CO., LTD.) was severally immersed with occasional stirring at 40° to 44° C. for 30 minutes and compressed to obtain each 560 ml of extracts. Then, each 80 g of the same black tea leaves as used above was severally immersed in each obtained extract with occasional stirring at 40° to 44° C. for 30 minutes and compressed to obtain each 440 ml of extracts. Further, each resulting extract was severally added with 5.3 g of filtering agent (RADIOLITE W-50 supplied by SHOWA CHEMICAL INDUSTRY CO., LTD.) and filtered being kept at 40° to 44° C. to obtain each 420 ml of final extracts. Cyclic dextrin used above was the mixture of 50% α-cyclic dextrin (RINGDEX-A supplied by SANRAKU-OCEAN CO., INC.) and 50% β-cyclic dextrin (CELDEX-N supplied by NIHON SHOKUHIN KAKO CO., LTD.).

TABLE 2

| | Sample | | | | | |
|---|---|---|---|---|---|---|
| | A | B | C | D | E | F |
| Cyclic dextrin content (%) in a cyclic dextrin-containing liquid | 0 | 1 | 2 | 4 | 6 | 8 |
| Brix (°) of the obtained extract | 6.8 | 8.2 | 9.2 | 11.0 | 13.6 | 15.0 |

Next, each of the obtained extracts (Samples A to F) was dissolved in hot water (95° C.) in an amount of 10 ml per 90 ml of hot water, and comparative organoleptic tests were made on the fragrance and the taste by a panel of 5 experts. The obtained results are shown in Table 3. With respect to each item, 6 points were given to the best sample, 5 points were given to the second sample, 4 points were given to the third sample, 3 points were given to the fourth sample, and 2 points were given to the fifth sample and 1 point was given to the sixth sample.

(2) Each 100 g of black tea leaves (the same black tea leaves as in the above (1)) was treated with each 700 g of cyclic dextrin-containing liquids (the same cyclic dextrin as in the above (1)) shown in Table 4 in the same manner as in the above (1). Then, each of the extracts G, H, I, J, K, (G, H, I, J, and K were severally used as they were), and L added with cyclic dextrin (the same cyclic dextrin as in the above (1)) to have the cyclic dextrin content of 2%, was severally added with 5.3 g of filtering agent (the same filtering agent as in the above (1)) and filtered being kept at 40° to 44° C. to obtain each 420 ml of final extracts. Each of the obtained extracts (Samples G to L) was subjected to the same comparative organoleptic tests as in the above (1). The obtained results are shown in Table 5.

TABLE 3

| | Evaluation | | Sensory view | |
|---|---|---|---|---|
| Sample | Fragrance | Flavor | Fragrance | Flavor |
| A | 7 | 8 | No substantial fragrance peculiar to black tea, and puckery smell | Strong puckery and bitter tastes bite the tongue |
| B | 12 | 16 | Slight fragrance, and puckery smell | Slight nasty bitter taste |
| C | 23 | 26 | Strong sweet fragrance peculiar to black tea, and well-balanced fragrance | Good puckery taste, and good balance of puckery, bitter and savory tastes |
| D | 27 | 24 | Strong sweet fragrance peculiar to black tea, and well-balanced fragrance | Good puckery taste, and good balance of puckery, bitter and savory tastes |
| E | 22 | 19 | Sweet fragrance peculiar to black tea, and well-balanced fragrance, and slight fermentation smell | Good balance of bitter and savory tastes, and slight weak puckery taste |
| F | 14 | 12 | Strong fermentation smell, and bad-balanced smell | Slight puckery and bitter tastes, and bad-balanced taste, and flat taste as a whole |

TABLE 4

| | Sample | | | | | |
|---|---|---|---|---|---|---|
| | G | H | I | J | K | L |
| Cyclic dextrin content (%) in a cyclic dextrin-containing liquid | 0.5 | 1.0 | 1.5 | 2.0 | 3.0 | 0 (2.0)* |
| Brix (°) of the obtained extract | 7.6 | 8.2 | 8.8 | 9.0 | 10.4 | 8.8 |

*Sample L was prepared by adding cyclic dextrin to the obtained extract in an amount of 2%.

TABLE 5

| | Sample | | | | | |
|---|---|---|---|---|---|---|
| | G | H | I | J | K | L |
| Fragrance | 10 | 15 | 22 | 25 | 27 | 6* |
| Flavor | 10 | 16 | 20 | 24 | 25 | 10 |

*No substantial sweet fragrance peculiar to black tea

From the test results ((1) and (2)), it will readily be understood that a black tea extract with a good flavor, especially in fragrance can be obtained by extracting with a cyclic dextrin-containing liquid having a cyclic dextrin (50%α and 50%β) content of 1.5 to 6.0%, and that an extract obtained by using a cyclic dextrin-containing liquid having a cyclic dextrin content (50%α and 50%β) of 8% gives strongly a partial smell and gives slight puckery and bitter tastes to result in giving a bad-balanced flavor.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A process for the preparation of instant beverages, which comprises extracting one part by weight of tea leaves with 4 to 15 parts by weight of an aqueous solution containing cyclic dextrin having a cyclic dextrin content of 1.5 to 6.0%, whereby the fragrance peculiar to tea is extracted and held by the cyclic dextrin in such a way that when hot water is added to the extract the fragrance is released, and spray-drying the extract.

2. A process according to claim 1, wherein the tea is selected from the group consisting of green tea, oolong tea and black tea.

3. A process according to claim 1, wherein the aqueous solution containing cyclic dextrin is a member selected from the group consisting of (a) an aqueous solution containing cyclic dextrin, and (b) an aqueous solution containing cyclic dextrin and acyclic dextrin.

* * * * *